US010771255B1

(12) United States Patent
Roth et al.

(10) Patent No.: US 10,771,255 B1
(45) Date of Patent: Sep. 8, 2020

(54) AUTHENTICATED STORAGE OPERATIONS

(71) Applicant: Amazon Technologies, Inc., Reno, NV (US)

(72) Inventors: Gregory Branchek Roth, Seattle, WA (US); Eric Jason Brandwine, Haymarket, VA (US)

(73) Assignee: Amazon Technologies, Inc., Seattle, WA (US)

(*) Notice: Subject to any disclaimer, the term of this patent is extended or adjusted under 35 U.S.C. 154(b) by 727 days.

(21) Appl. No.: 14/225,264

(22) Filed: Mar. 25, 2014

(51) Int. Cl.
H04L 9/32 (2006.01)
H04L 9/08 (2006.01)

(52) U.S. Cl.
CPC .......... H04L 9/3247 (2013.01); H04L 9/0819 (2013.01)

(58) Field of Classification Search
CPC .................... H04L 9/3247; H04L 9/0819
See application file for complete search history.

(56) References Cited

U.S. PATENT DOCUMENTS

| 5,179,591 | A | 1/1993 | Hardy et al. |
| 5,200,999 | A | 4/1993 | Matyas et al. |
| 5,497,421 | A | 3/1996 | Kaufman et al. |
| 6,084,969 | A | 7/2000 | Wright et al. |
| 6,097,817 | A | 8/2000 | Bilgic et al. |
| 6,185,316 | B1 | 2/2001 | Buffam |
| 6,233,565 | B1 * | 5/2001 | Lewis .................. G06Q 20/00 705/26.1 |
| 6,453,416 | B1 | 9/2002 | Epstein |
| 6,826,686 | B1 | 11/2004 | Peyravian et al. |
| 6,851,054 | B2 | 2/2005 | Wheeler et al. |
| 6,957,393 | B2 | 10/2005 | Fano et al. |
| 6,959,394 | B1 | 10/2005 | Brickell et al. |
| 6,985,583 | B1 | 1/2006 | Brainard et al. |
| 7,010,689 | B1 | 3/2006 | Matyas et al. |
| 7,073,195 | B2 | 4/2006 | Brickell et al. |
| 7,139,917 | B2 | 11/2006 | Jablon |
| 7,228,417 | B2 | 6/2007 | Roskind |
| 7,320,076 | B2 | 1/2008 | Caronni |
| 7,512,965 | B1 | 3/2009 | Amdur et al. |

(Continued)

FOREIGN PATENT DOCUMENTS

| WO | WO2006077822 | 7/2006 |
| WO | WO2008024705 | 2/2008 |
| WO | WO2014063361 | 5/2014 |

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

(Continued)

Primary Examiner — Azizul Choudhury
(74) Attorney, Agent, or Firm — Davis Wright Tremaine LLP

(57) ABSTRACT

Data storage operation commands are digitally signed to enhance data security in a distributed system. A data storage client and a data storage node may share access to a cryptographic key. The data storage client uses the cryptographic key to digitally sign commands transmitted to the data storage node. The data storage node uses its copy of the cryptographic key to verify a digital signature of a command before fulfilling the command. The command may include a log of database transactions to process.

26 Claims, 9 Drawing Sheets

(56) References Cited

U.S. PATENT DOCUMENTS

| | | |
|---|---|---|
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van de Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,752,203 B2 * | 6/2014 | Reinertsen ............... G06F 21/10 713/170 |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth |
| 9,219,753 B2 * | 12/2015 | Fleischman ............. H04L 63/20 |
| 9,245,140 B2 * | 1/2016 | Hashimoto ......... G06F 21/6209 |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Walezcak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0293156 A1 * | 11/2010 | Tanaka .................. G06F 16/217 707/718 |
| 2010/0332845 A1 | 12/2010 | Asaka |
| 2011/0004753 A1 | 1/2011 | Gomi et al. |
| 2011/0010538 A1 | 1/2011 | Falk |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |

(56) References Cited

U.S. PATENT DOCUMENTS

| | | | |
|---|---|---|---|
| 2011/0265172 A1 | 10/2011 | Sharma et al. | |
| 2011/0296497 A1 | 12/2011 | Becker | |
| 2011/0311055 A1 | 12/2011 | Parann-Nissany | |
| 2011/0320606 A1 | 12/2011 | Madduri et al. | |
| 2012/0017095 A1 | 1/2012 | Blenkhorn et al. | |
| 2012/0020474 A1 | 1/2012 | Kudoh et al. | |
| 2012/0023334 A1 | 1/2012 | Brickell et al. | |
| 2012/0036551 A1 | 2/2012 | Le Saint et al. | |
| 2012/0054625 A1 | 3/2012 | Pugh et al. | |
| 2012/0060035 A1 | 3/2012 | Kalmady et al. | |
| 2012/0106735 A1 | 5/2012 | Fukuda | |
| 2012/0110636 A1 | 5/2012 | Van Biljon et al. | |
| 2012/0144034 A1 | 6/2012 | McCarty | |
| 2012/0159577 A1 | 6/2012 | Belinkiy et al. | |
| 2012/0233216 A1 | 9/2012 | Lim | |
| 2012/0243687 A1 | 9/2012 | Li | |
| 2012/0245978 A1 | 9/2012 | Jain | |
| 2012/0265690 A1 | 10/2012 | Bishop et al. | |
| 2012/0317414 A1 | 12/2012 | Glover | |
| 2013/0031255 A1 | 1/2013 | Maloy et al. | |
| 2013/0086662 A1 | 4/2013 | Roth | |
| 2013/0086663 A1 | 4/2013 | Roth et al. | |
| 2013/0111217 A1 | 5/2013 | Kopasz et al. | |
| 2013/0124870 A1* | 5/2013 | Rosati | H04L 9/0847 713/176 |
| 2013/0132232 A1 | 5/2013 | Pestoni et al. | |
| 2013/0145447 A1 | 6/2013 | Maron | |
| 2013/0166918 A1 | 6/2013 | Shahbazi et al. | |
| 2013/0191884 A1 | 7/2013 | Leicher et al. | |
| 2013/0198519 A1 | 8/2013 | Marien | |
| 2013/0254536 A1 | 9/2013 | Glover | |
| 2013/0282461 A1 | 10/2013 | Ovick et al. | |
| 2013/0318630 A1 | 11/2013 | Lam | |
| 2014/0013409 A1 | 1/2014 | Halageri | |
| 2014/0082715 A1 | 3/2014 | Grajek et al. | |
| 2014/0122866 A1 | 5/2014 | Haeger et al. | |
| 2014/0181925 A1 | 6/2014 | Smith | |
| 2014/0208408 A1 | 7/2014 | Bilgen et al. | |
| 2014/0281477 A1 | 9/2014 | Nayshtut et al. | |
| 2014/0281487 A1 | 9/2014 | Klausen et al. | |
| 2015/0082039 A1 | 3/2015 | Stalzer et al. | |
| 2015/0089614 A1 | 3/2015 | Mathew et al. | |

OTHER PUBLICATIONS

Berners-Lee et al., "Uniform Resource Identifier (URI): Generic Syntax," Network Working Group Request for Comments: 3986, The Internet Society 2005 retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014 in International Patent Application No. PCT/US2014/057043, filed Sep. 23, 2014.

International Search Report and Written Opinion dated Dec. 30, 2014 in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 System Administrator's Guide [online]," May 2012 [retrieved on Jun. 27, 2012], Retrieved from the Internet: http://web.mit.edu/kerberos/krb5-1.10/krb5-1.10.2/doc/krb5-admin.html, 57 pages.

Massachusetts Institute of Technology, "Kerberos V5 Installation Guide [online]," May 2012 [retrieved on Jun. 27, 2012], retrieved from the Internet: http://web.mit.edu/kerberos/krb5-1.10/krb5-1.10.2/doc/krb5-install.htm, 65 pages.

Massachusetts Institute of Technology, "Kerberos V5 UNIX User's Guide," dated May 2012, retrieved on Jun. 28, 2012, from <http://web.mit.edu/kerberos/krb5-1.10/krb5-1.10.2/doc/krb5-user.html>, 38 pages.

Patent Cooperation Treaty, "Notification of Transmittal of the International Search Report and the Written Opinion of the International Searching Authority, or the Declaration," issued to International Application No. PCT/US/058083 dated Dec. 27, 2012.

Roth et al., "Hierarchical Data Access Techniques," U.S. Appl. No. 13/431,882, filed Mar. 27, 2012.

Simpson, "PPP Challenge Handshake Authentication Protocol (CHAP)," Network Working Group, Aug. 1996, retrieved from internet Jun. 27, 2012, https://tools.ietf.org/html/rfc1994, 13 pages.

U.S. Appl. No. 13/431,760, filed Mar. 27, 2012.

U.S. Appl. No. 13/431,898, filed Mar. 27, 2012.

Wang et al., "Extending the Security Assertion Markup Language to Support Delegation for Web Services and Grid Services," IEEE International Conference on Web Services 1:67-74, Jul. 11-15, 2005.

Wikipedia, "Physical unclonable function," retrieved Aug. 22, 2013, from http://en.wikipedia.org/wiki/Physical_unclonable_function, 8 pages.

TCG Published, "TPM Main Part 1 Design Principles," Specification Version 1.2, Revision 116, Mar. 1, 2011, 184 pages.

TCG Published, "TPM Main Part 2 TPM Structures," Specification Version 1.2, Level 2 Revision 116, Mar. 1, 2011, 202 pages.

TCG Published, "TPM Main Part 3 Commands," Specification Version 1.2, Level 2 Revision 116, Mar. 1, 2011, 339 pages.

* cited by examiner

AUTHENTICATED STORAGE OPERATIONS

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Many techniques have been developed to enhance data security. Utilization of these techniques, however, often require the use of additional computing resources, such as processing and memory capacity. Use of the extra resources often adds latency to electronic request fulfillment due to the performance of operations, such as encryption operations, that are performed. While the additional latency and resource usage can be acceptable for many contexts, in other contexts low latency is of high importance. Conventional techniques for providing data security often require an unacceptable tradeoff between latency and security.

BRIEF DESCRIPTION OF THE DRAWINGS

Various embodiments in accordance with the present disclosure will be described with reference to the drawings, in which.

DETAILED DESCRIPTION

Figure 1:
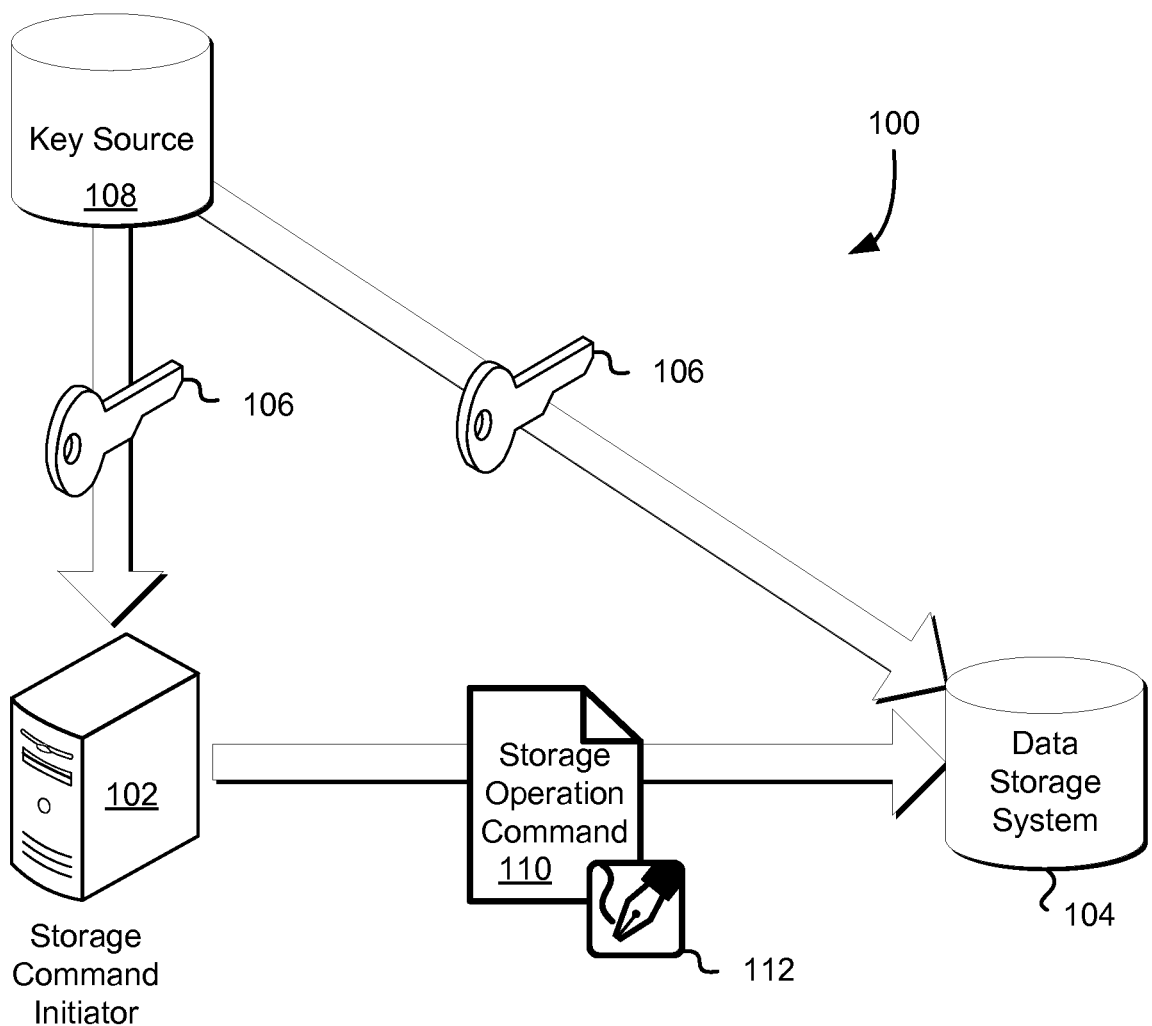
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the authentication of data storage operation commands in a distributed system. In various examples, a data storage service provides a frontend subsystem that receives application programming interface (API) calls or other requests whose fulfillment involves the performance of data storage operations. To fulfill the data storage operations, the frontend subsystem may transmit data storage operation commands, such as input/output commands, to a backend subsystem that performs the commanded data storage operations. In some embodiments, the data storage operation commands are sent synchronously relative to the API calls that caused the commands to be transmitted while in other embodiments, the data storage operations commands are sent asynchronously relative to the API calls that cause the commands to be transmitted and in yet other embodiments, some data storage operation commands are sent synchronously while others are sent asynchronously. In the case of asynchronously sent data storage operation commands, the commands may take the form of logs (i.e., commands to process logs) of operations that were performed by the frontend system and that are to be persisted in the backend system. In this manner, the frontend system is able to process API calls with low latency.

To enhance data security, data storage operation commands are digitally signed by the frontend subsystem for verification by the backend subsystem. In some examples, data storage operation commands may be transmitted from the frontend subsystem to the backend subsystem over multiple Internet Protocol (IP) packets or other units of data transmission. For example, an input/output command may be a write command that specifies an address to which to write data. The data may be sufficiently large that multiple IP packets are required for the transmission of the command. In this example, a single digital signature may be applied to an input/output command whose complete transmission is accomplished by multiple transmissions, each with a portion of the input/output command. The individual packets may or may not be additionally signed, in various embodiments. In other words, a single digitally signed storage operation command may be broken up over multiple transmissions. The address specified in the data storage operation command may specify a device-level address of data to be operated upon (e.g., read, written, or transformed) such as a physical or logical block address or physical or logical offset. The backend subsystem may be configured to perform a commanded data storage operation on a condition that a digital signature of the data storage operation command is valid. In some embodiments, the digital signatures are generated using a symmetric digital signature scheme where the entity signing a message, thereby resulting in a digital signature, uses the same cryptographic key (i.e., a copy of the cryptographic key) that is used to verify the digital signature such as Hash Based Message Authentication, Cipher Block Chaining based message authentication, or other message authentication (MAC) scheme. Various techniques for ensuring that the signing entity (e.g., frontend subsystem, as above) and verifying entity (e.g., backend subsystem, as above) have access to the same cryptographic key may be used.

In some embodiments, a central key authority is a computer system that securely manages cryptographic keys for one or more entities. To prevent unauthorized access to security stored cryptographic keys, the central key authority may derive keys that are then passed to the appropriate entities for digital signature generation and/or verification. Key derivation may be performed in a secure manner so that derived keys, should they become compromised, do not provide the ability to access (e.g., determined) the keys from which they are derived. In some embodiments, a key is or is otherwise based at least in part on the output of a one-way function, where a one-way function is a function that satisfies one or more conditions for preimage resistance (i.e., functions that are effectively one-way, even if not provable as such). Example functions suitable for use as effectively one-way include, but are not limited to, cryptographic hash functions, message authentication codes (including, but not limited to, hash-based message authentication codes), key derivation functions (including, but not limited to, Password-Based Key Derivation Function 2 (PBKDF2) and bcrypt) and others.

In an embodiment, to derive a key, the output of the one-way function is applied to a cryptographic key and an encoding of a restriction of use. The encoding of the restriction of use may be a series of bits representing a limitation on use of the cryptographic key used to derive another cryptographic key. As an example, a series of bits representing the string "West" may be used as input to the one-way function along with other input that is or that is otherwise based at least in part on the cryptographic key. The term "West" may refer to a region (e.g., logical grouping of data centers) for which the derived key is usable, although the restrictions input into the function do not necessarily have semantic meaning. Other restrictions may also be used including, but not limited to, region, time, service, user, logical grouping of computing resources, resource and others. As discussed in more detail, a key may be derived iteratively, with each iteration resulting in an intermediate key subject to an additional restriction. This scoping of cryptographic keys may be used to distribute keys derived from a securely maintained cryptographic key (root key) so that, if one distributed key is compromised, the root key is still usable without affecting the security of other systems having different keys derived from the root key.

In an embodiment, a scoped key (key derived from a root key and one or more restrictions) is provided to both a signing entity and a verifying entity, thereby enabling the signing entity to create digital signatures that are verifiable by the verifying entity. Further, in some embodiments, a system utilizing the techniques described herein operates in a multi-tenant environment where, for example, a computing resource service provider manages data on behalf of multiple customers. Subsystems (e.g., individual devices) may be provided keys for the customers' data managed by those subsystems. For example, if a data storage system manages data for a proper subset of the customers, the data storage system may be provided a derived key for each of the customers of the proper subset without providing the data storage system cryptographic keys corresponding to other customers. In this manner, subsystems are provided the keys needed to ensure that data storage operations are performed securely in a distributed system.

FIG. 1 shows an illustrative example of an environment 100 in which various embodiments can be practiced. As illustrated in FIG. 1 the environment 100 includes a storage command initiator 102 and a data storage system 104. The storage command initiator 102 may be implemented in various ways in accordance with various embodiments. For example, in some embodiments, the storage command initiator is a computer system that processes database queries submitted to it in the form of API calls. Generally, the storage command initiator is a computer system that issues storage operation commands to be performed by another system such as described in more detail below. The data storage system 104 may be a system that performs various operations in response to storage operations command where the operations relate to the persistent storage of data. For example, in some embodiments the data storage system 104 as described in more detail below may be a backend system of a database system which may be operated as part of a database service. Other example data storage systems 104 include storage area networks (SANs), hard drives with spinning magnetic media, and/or solid state media, and generally devices and systems of multiple devices that persistently store data. While systems that persistently store data are used throughout for the purpose of illustration, the techniques described herein are useable in connection with other data storage systems that do not necessarily persistently store data such as data storage systems that maintain data in volatile memory without persistently storing the data.

As illustrated in FIG. 1, in various embodiments, both the storage command initiator 102 and the data storage system 104 have access to the same cryptographic key 106. The cryptographic key 106 may be a symmetric cryptographic key used for the performance of symmetric cryptographic algorithms. Examples of symmetric cryptographic algorithms include those discussed above and encryption/decryption algorithms, such modes of the advanced encryption standard (AES), the data encryption standard (DES), triple DES (3DES), Serpent, Twofish, blowfish, CAST5, RC4 and the international data encryption algorithm (IDEA). In an embodiment, the storage command initiator 102 and the data storage system 104 receive copies of the cryptographic key 106 from a key source 108. The key source 108 may be a system that manages keys on behalf of one or more entities. For example, the key source may be a computer system that securely stores cryptographic keys, providing copies of the cryptographic keys only to entities authorized to receive such copies. As discussed in more detail below, the key source 108 may itself receive cryptographic keys from another key source. As keys are passed from one entity to another, the keys may be scoped using techniques discussed herein so that a first system with access to a first key uses the first key to derive a second key that is passed onto a second system.

In some embodiments, receipt of a cryptographic key associated with a customer of the service provider from the key source 108 configures the storage command initiator 102 with an association of the customer with the cryptographic key. In this manner, if/when a request is received from or on behalf of the customer, as a result of the association, the storage command initiator 102 has the ability to digitally sign storage commands using the cryptographic key. The cryptographic key, in some examples, is usable by the storage command initiator to verify requests submitted by or on behalf of the customer prior to digitally signing storage commands as part of fulfillment of the requests. In some other embodiments, the key source 108 may be an authentication subsystem of a computing resource service provider. In some embodiments, the storage command initiator receives digitally signed requests (e.g., in the context of a customer/service-provider relationship, from customers of the service provider and/or from other systems operating on behalf of the customers, which may be subsystems of the service provider) and transmits the digitally signed requests to the key source 108 for verification. When presented with a digital signature of a request, which serves as a form of proof of the pending request, the key source 108 may verify the digital signature and, on a condition that the digital signature is verified, communicate to the storage command initiator 102 that the request is verified. It should be noted that the storage command initiator, in some embodiments, may be able to exhibit proof of a pending customer request without having received the request from the customer itself. Such may be the case, for example, in embodiments, where the request is generated and transmitted by an entity different from the customer but on behalf of and with authorization from the customer, such as from another service of the service provider or from a third-party computer system operating on behalf of the customer.

To verify the digital signature, the key source 108 may access a cryptographic key from memory and provide a cryptographic key to the storage command initiator to digitally sign one or more storage commands to be transmitted to the data storage system 104. The cryptographic key provided to the storage command initiator may be the same cryptographic key that was accessed by the key source 108 or a different cryptographic key derived therefrom (e.g., using techniques described elsewhere herein). In this manner, the storage command initiator 102 has access to a cryptographic key for signing one or more storage commands as a result of an association of the cryptographic key that was provided with the customer, the association being formed through an association of the customer with another cryptographic key from which the provided cryptographic key was derived.

As noted above, in various embodiments, the storage command initiator 102 issues storage operation commands to the data storage system 104. Such data storage commands may be configured to cause the data storage system 104 to perform one or more operations specified by the storage operation command. In an embodiment, the storage command initiator 102 digitally signs storage operations commands for verification by the data storage system 104. As illustrated in FIG. 1, for example, the storage command initiator 102 transmits a storage operation command 110 to the data storage system 104 along with a digital signature 112 of the data storage operations command 110. In this manner, as discussed in more detail below, the data storage system 104 upon receipt of the storage operation command 110 can verify the digital signature 112 to determine whether to fulfill the storage operation command 110 from the storage command initiator 102. Further, in this manner, unauthorized transmission of commands to the data storage system 104 may be ineffective in corrupting or otherwise manipulating data stored by the data storage system 104. The data storage command may be configured in accordance with a data storage command protocol, which may be a structured query language (SQL) command, a binary input/output (I/O) protocol, a block-level storage operation command or otherwise. Other examples include the small computer system interface (SCSI) and serial ATA. Variations of such protocols may also be used, such as Internet SCSI (iSCSI) and SCSI over Fiber Channel. The data storage command may be transmitted over another protocol, such as by encoding the command in a data packet transmitted over a network. For example, the command may be encoded in a TCP/IP packet or Fiber Channel (FC) packet. While examples of specific protocols are provided for the purpose of illustration, the techniques described herein are extendible to other protocols including, but not limited to, proprietary protocols. Further, such a binary I/O protocol used with the techniques described herein may include the ability to encode policy (to be enforced by a signature verifying entity, e.g.), bearer tokens, cookies, cryptographic key identifiers, and/or other metadata. Generally, a storage operation command (also referred to as a data storage operation command) may be any digital encoding of a command and associated metadata that is receivable by a data storage system to cause the data storage system to fulfill the command (in accordance with the metadata, if applicable). Further, storage operation commands may be transmitted in plaintext (i.e., unencrypted) for to avoid latency caused by the need to perform encryption/decryption operations.

The storage command initiator may generate the digital signature 112 based at least in part on the cryptographic key 106. In some examples, the storage operations command 110, or a portion thereof, is input along with the cryptographic key 106 into a one way function. For example, in an embodiment, the digital signature 112 is computed as, or otherwise based at least in part on, a hash based message authentication code of the cryptographic key 106 and the storage operation command 110. In another example, a one way function may be used to derive from the cryptographic key 106 another cryptographic key which is used to generate the digital signature 112 based at least in part on the storage operation command 110. Example methods for deriving keys are discussed above and in more detail below. When the data storage system 104 receives a storage operation command 110 from the storage command initiator 102, the data storage system 104 may verify the digital signature 112 provided with the storage operation command 110. The digital signature 112 may be verified by the data storage system 104 in various ways in accordance with various embodiments. For example, the data storage system 104 may use its copy of the cryptographic key 106 to generate a reference digital signature in the same manner by which the storage command initiator 102 generated the digital signature 112 that was provided with the storage operation command 110. If the reference signature matches the digital signature 112, the data storage system 104 may operate in accordance with the digital signature 112 being verified. As another example, the data storage system 104 may derive the same key that was derived by the storage command initiator 102 and use the derived key to generate a reference signature which is compared to the digital signature 112. In this manner, storage operation commands for which a digital signature is required may be fulfilled by the data storage system 104 only when provided a valid digital signature which ensures that only systems with access to a suitable cryptographic key can cause some or all updates to the data storage system 104.

Figure 2:
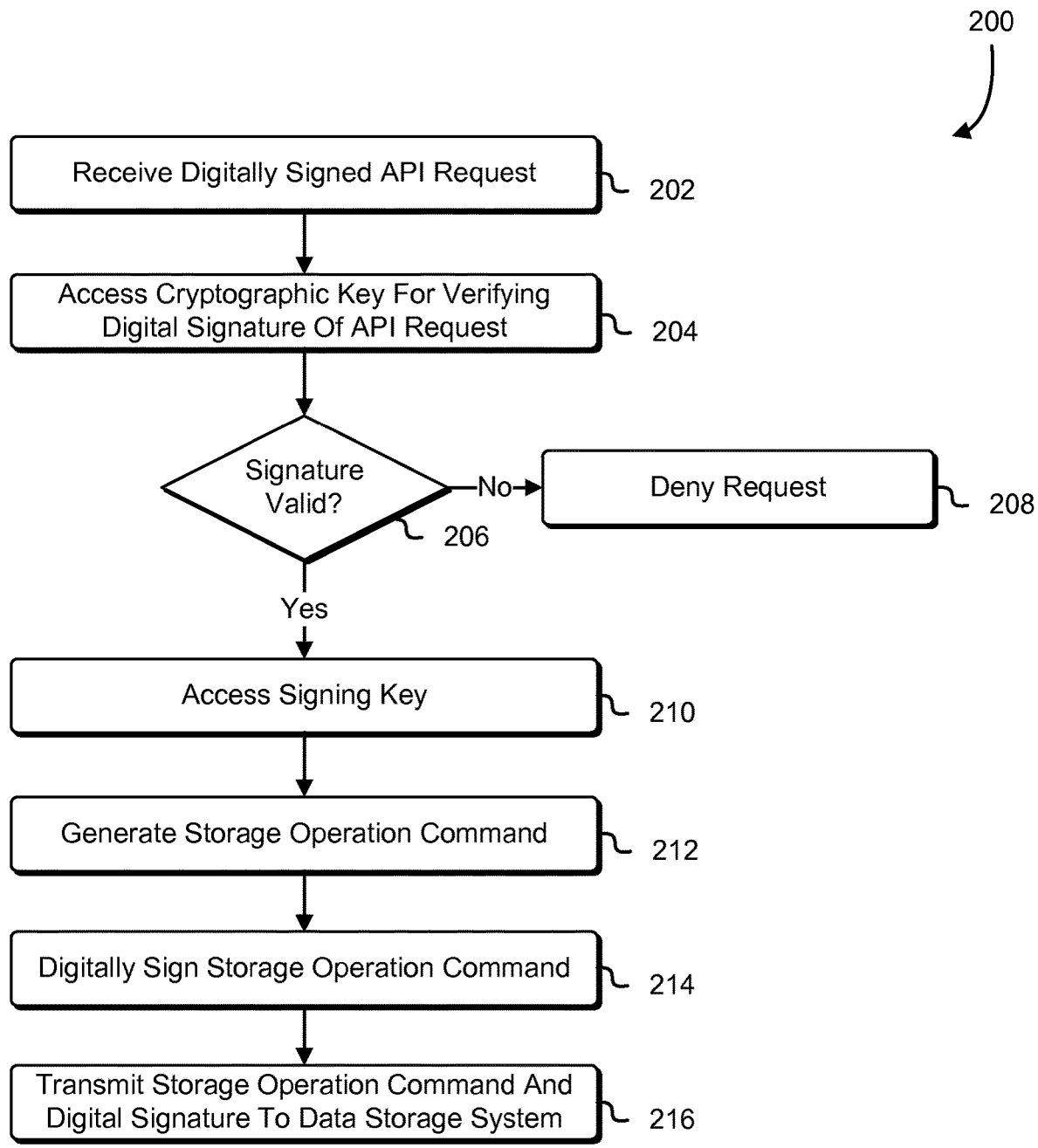
FIG. 2 shows an illustrative example of a process for transmitting a storage operation command in accordance with at least one embodiment.

FIG. 2 shows an illustrative example of a process 200 for transmitting storage operation commands in accordance with an embodiment. The process 200 may be performed by any suitable system such as by the storage command initiator 102 discussed above in connection with FIG. 1. In an embodiment, the process 200 includes receiving 202 a digitally signed application programming interface (API) request. The API request that is received 202 may be formatted in various ways in accordance with various embodiments. For example, in some embodiments, the API request is a web service request received over a network. The API request (also referred to as an API call) may be transmitted in accordance with an application level protocol, such as the HyperText Transfer Protocol (HTTP). The request may be formatted such that fulfillment of the request involves the performance of a data storage operation and therefore transmission of a storage operation command such as described above. In an embodiment, upon receipt 202 of the digitally signed API request, the process 200 may include accessing 204 a cryptographic key for verifying a digital signature of the API request. Accessing 204 the cryptographic key may be performed in various ways in accordance with various embodiments. For example, in some embodiments, one or more features of the API request are used to select a suitable cryptographic key from a plurality of cryptographic keys. An identity of an entity that submitted the API request, for example, may be associated with the cryptographic key that is usable to verify digital signatures submitted by that identity. As another example, the request may include an identifier of a cryptographic key that enables selection of a suitable cryptographic key based in part on the identifier included in the request. Generally, any way by which a suitable cryptographic key usable for verifying the request is determinable may be used.

Upon having accessed 204 the cryptographic key, the process 200 may include determining 206 whether the digital signature is valid. In various embodiments, for example, the cryptographic key that has been accessed is a symmetric cryptographic key and determining 206 whether the digital signature is valid may include generating a reference digital signature of the API request (or portion thereof) and determining whether the reference signature matches the digital signature that was received with the API request. If it is determined 206 that the signature is not valid, the process 200 may include denying 208 to the request. The request may be denied 208 in various ways in accordance with various embodiments. For example, in some embodiments, denying the request includes providing a response to the request that indicates that the request is denied and/or indicates one or more reasons for its denial. Other ways by which a request may be denied may include simply not performing additional operations in connection with the request. Generally denying the request may include any suitable way of avoiding fulfillment of the request.

If, however, it is determined 206 that the signature is valid, the process 200 may include accessing a signing key. In an embodiment, a signing key is a cryptographic key usable to digitally sign a storage operation command to enable submission of the storage operation command along with the digital signature such that the digital signature will be successfully verified upon receipt and the storage operation command will, as a result, be fulfilled. The signing key that is accessed 210 may vary in accordance with various embodiments. In some examples, the signing key is the same cryptographic key used to verify the digital signature of the API request. In other examples, the signing key is a key derived (such as in accordance with various techniques described herein) based at least in part on the cryptographic key used for verifying the digital signature of the API request. In yet another example, the signing key may be a cryptographic key from which the cryptographic key used for verifying the digital signature of the API request is derived. In yet another example, neither the signing key nor the cryptographic key used for verifying the digital signature of the API request is derived from the other. It should be noted that in embodiments where the cryptographic key used for verifying the digital signature of the API request and the signing key are the same, the operation of accessing 210 the signing key may have already been performed and thus may be considered to not be a separate operation.

Regardless of how the signing key has been accessed 210, the process 200 may include generating 212 a storage operation command. In an embodiment, the storage operation command is a command to perform a data storage operation that matches the API request that was received 202. For example, an application programming interface of a system through which API calls are submittable may have a variety of API calls that may be made to effect data storage operations. The various types of API calls that are made may correspond to types of storage operation commands that are transmitted as part of fulfillment of the API calls. Further, generating a storage operation command may include populating a template for a command with data which may be data received in the request. As an illustrative example, if the API request is an API request to store data, the storage operation command may include or otherwise specify the data to be stored that was included in the API request. Once the storage operation command has been generated 212, the process 200 may include digitally signing 214 the storage operation command which, as discussed above, may include using the accessed 210 signing key to generate a digital signature based, at least in part, on the generated 212 storage operation command. Once the storage operation command has been digitally signed 214, the process 200 may include transmitting 216 the storage operation command and the digital signature that was generated to a data storage system, where the data storage system may be a system configured to verify the digital signature using its own copy of the signing key (which it may have to derive, in some embodiments) and, upon verification of the digital signature, fulfilling the storage operation command.

FIG. 2 shows a process where a storage command is transmitted as a result of a received API request being fulfilled. Storage commands may be transmitted in other ways. For example, in some embodiments, a system that receives API requests is operable to fulfill the API requests by performing log operations where the log operations are transmitted at a later time to another system that processes a log in order to persistently store data in accordance with the operations that were performed. A system that receives API requests may, for instance, utilize in a memory copy of a database to provide low latency access to the database through, for example, appropriately configured database queries. Thus, the system may provide quick performance of fulfillment of API requests by utilizing the in-memory copy of the database. To maintain the persistently stored copy of the database, another system may maintain the copy of the database in persistent storage. The system with the in-memory copy of the database may transmit logs of the operations that were performed which may then be processed by the system with the persistently stored copy of the database in order to update the persistently stored copy of the database asynchronously with the API requests that were received.

Figure 3:
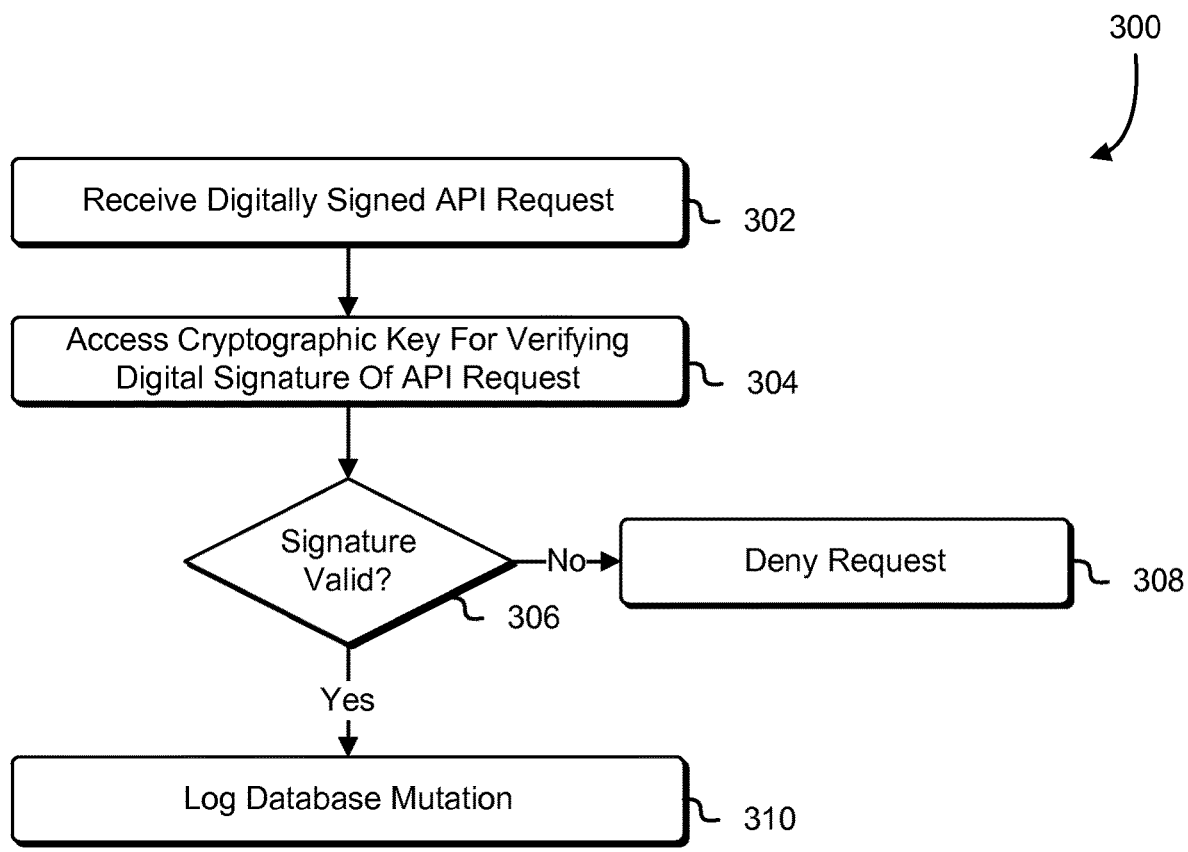
FIG. 3 shows an illustrative example of a process for logging database operations in accordance with at least one embodiment.

FIG. 3, accordingly, shows an illustrative example of a process 300 for processing API requests in accordance with various embodiments. The process 300 may be performed by any suitable system, such as by a storage command initiator 102 described above in connection with FIG. 1. In an embodiment, the process 300 includes receiving 302 a digitally signed API request, such as described above. Further, as described above, the process 300 may include accessing 304 a cryptographic key for verifying a digital signature of the received 302 API request. A determination may be made 306 whether the signature is valid. Determining whether the signature is valid may be performed, such as described above. If determined 306 that a signature is invalid, the process 300 may include denying 308 the request, such as described above. However, if it is determined 306 that the signature is valid, the process 300 may include logging 310 a database mutation corresponding to fulfillment of the API request that was received. For example, if the API request was a request to store data, a logged entry may indicate the data that was stored. As another example, if the API request was to increment a value by a certain amount, a logged entry may indicate the value that was indicated by a certain amount. Other data storage operations resulting in the mutation of a data set may also be performed.

While not illustrated in the figures, additional operations may be performed as part of performance of the process 300. For example, in the processes 200 and 300 described above, additional operations, such as transmitting acknowledgments of fulfillment of the API requests, may be performed. Further, when a storage operation command is transmitted, the process may also include receiving an acknowledgement that the storage operation command was received and/or fulfilled. Generally, the various environments in which the techniques of the present disclosure may be practiced may result in variations to the processes described herein.

Figure 4:
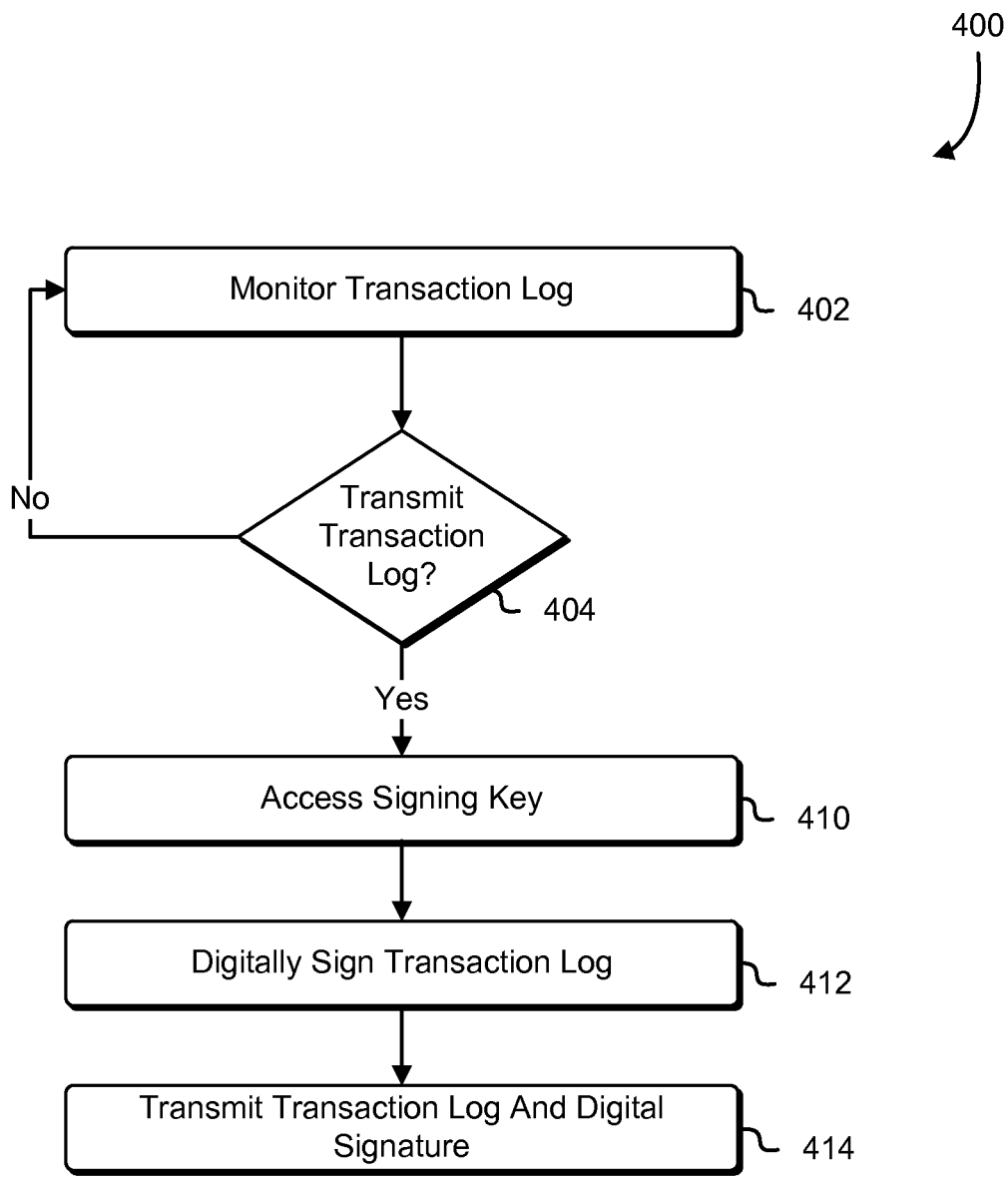
FIG. 4 shows an illustrative example of a process for transmitting a database transaction log in accordance with at least one embodiment.

FIG. 4 shows an illustrative example of a process 400 for transmitting transaction logs in accordance with an embodiment. The process 400 may be performed by any suitable system, such as a by a storage command initiator 102 described above. In an embodiment, the process 400 includes monitoring 402 a log which, as discussed above, may be a database transaction log. A log may be monitored in various ways in accordance with various embodiments. In some examples, the log is monitored for size which may be measured in a number of recorded transactions. In other examples, the log may be monitored for an amount of time that has passed since some event, such as the creation of the log or the creation of a record in the log that has not been synchronized with a backend system. Generally, any way by which a log may be monitored may be used. A determination may be made 404 whether to transmit the transaction log. The determination that is made 404 may be based, at least in part, on one or more measurements made during monitoring 402 of the transaction log. Measurements made include, for example, an amount of time that has passed since an event and/or the size of the log.

If it is determined 404 not to transmit the transaction log, monitoring 402 the transaction log may continue such as described above. If, however, it is determined 404 to transmit the transaction log, the process 400 may include accessing 410 a signing key. The signing key may be a cryptographic key usable to generate an electronic signature that is verifiable by a system to which the transaction log is to be submitted. Further, the signing key may be selected from a plurality of signing keys which may each have different scopes of use. In some examples, embodiments of the present disclosure are implemented in multi-tenant environment where computing resources are maintained on behalf of multiple customers of a computing resource service provider. A key associated with a particular customer that is also associated with the transaction log being monitored 402 may be selected. Similarly, a system performing the process 400 may have access to multiple keys, each corresponding to different databases. Accessing 410 the signing key may be performed by selecting a signing key associated with a database for which the transaction is being monitored 402. Also, as noted above, a signing key may have been already accessed in order to verify a digital signature of an API request that was received and, accordingly, the signing key may have already been accessed.

In an embodiment, the process 400 includes using the accessed 410 signing key to digitally sign 412 the transaction log. Digitally signing 412 the transaction log may be performed in suitable manner, such as described above. The digitally signed transaction log may be transmitted 412 to another system, such as described in more detail below, such as, in reference to FIG. 1, the data storage system 104. In this manner, a system to which the transaction log is transmitted can verify the digital signature that was generated by digitally signing 412 the transaction log to determine how the transaction log should be processed.

As with all processes described herein, variations of the process 400 are considered as being within the scope of the present disclosure. For example, FIG. 4 shows the process where a transaction log is monitored and then digitally signed for transmission at an appropriate time. In some embodiments, a system performing the process 400 may generate a new transaction log each time a previous transaction log is transmitted to be processed by another system. Thus, for example, upon performance of the process 400, a new transaction log may be created in order to record fulfillment of subsequently-received storage operation commands. In some embodiments, however, a single transaction log is used throughout multiple performance of the process 400 or variations thereof. Accordingly, the process 400 may be modified so that a portion of the transaction log is digitally signed, such as a portion that is to be transmitted for processing by the system to which the portion of the transaction log is transmitted. In this manner, additional events may be recorded into the transaction log, but only a portion is transmitted at a time, and only the portion that is being transmitted at a particular time is digitally signed to enable a receiver of the transmission of the portion of the transaction log to verify the digital signature. Other variations are also considered as being within the scope of the present disclosure.

Figure 5:
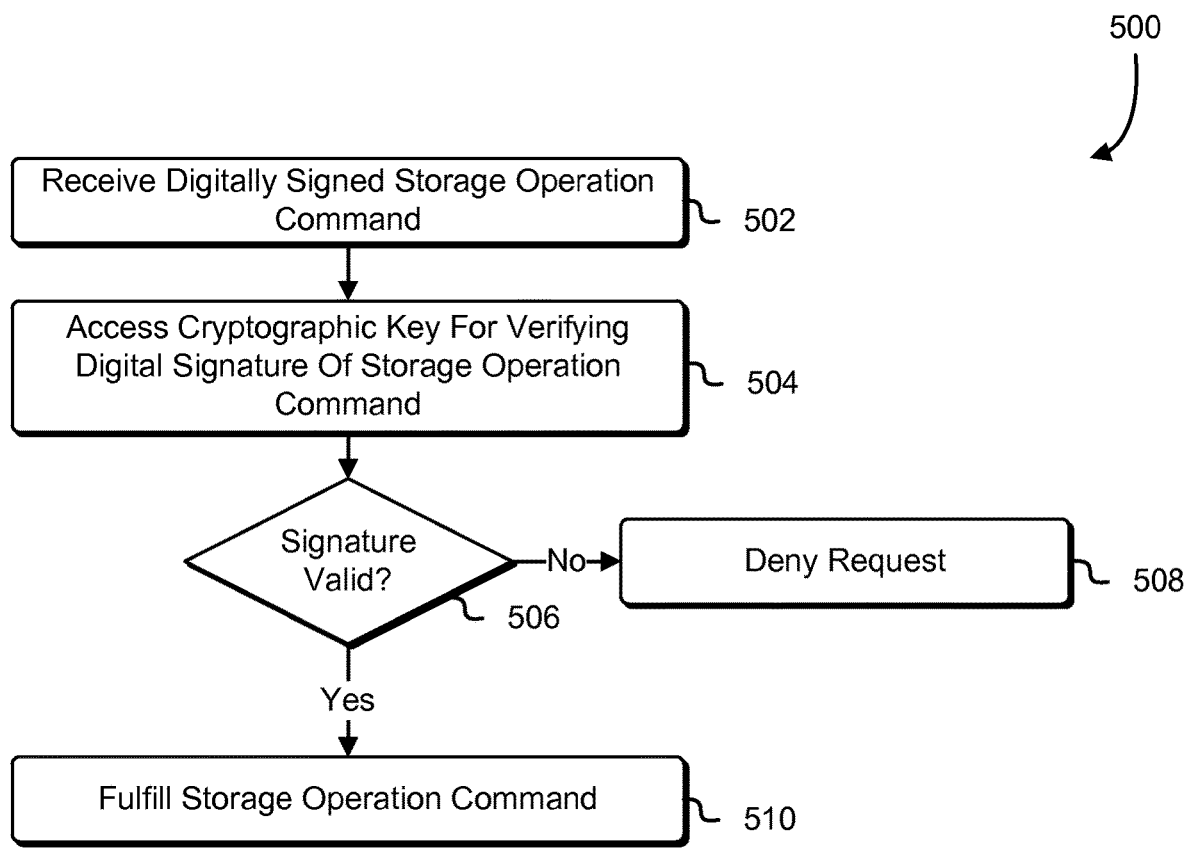
FIG. 5 shows an illustrative example of a process for fulfilling a storage operation command in accordance with at least one embodiment.

FIG. 5 shows an illustrative example of a process 500 which may be used to process storage operation commands. The process 500 may be performed by any suitable system, such as a system that receives storage operation commands such as the data storage system described above in connection with FIG. 1. In an embodiment, the process 500 includes receiving 502 a digitally signed storage operation command. The digitally signed storage operation command may be received 502 in various ways, such as over a network separating the system that issues the system that issued the storage operation command and the system performing the process 500. The storage operation command may be in various forms in accordance with various embodiments. For example, in some embodiments, the storage operation command is a communication instructing to perform a particular data operation or set of data operations. As noted above, however, the storage operation command can come in the form of a transaction log. Thus, the storage operation command may be considered to be a command to process a transaction log, such as described in more detail below. Upon receipt 502 of the digitally signed storage operation command of the process 500 may include accessing 504 a cryptographic key for verifying the digital signature of the storage operation command that was received 502. As noted above, systems performing various processes described herein may have access to multiple cryptographic keys, such as cryptographic keys for multiple customers and/or multiple for multiple uses, such as a different key for each database or each portion of a database, such as for each table of a database. Accordingly, accessing 504 the cryptographic key for verifying the digital signature of the storage operation command may include selecting a cryptographic key from multiple cryptographic keys. In some embodiments, information received in the storage operation command may enable selection of the cryptographic key. For example, the command may include an identifier for a customer, of a database, of a table in a database, of a cryptographic key, or of other information associated with the cryptographic key that is accessed.

In an embodiment, the process 500 includes determining 506 whether the digital signature of the received 502 digitally signed storage operation command is valid. Determining 506 whether the signature is valid may be performed such as described above. For example, the accessed 504 cryptographic key may be used to generate a reference digital signature of the storage operation command and the determination 506 whether the signature is valid may include comparing the reference digital signature to the digital signature that was received 502 with the storage operation command. If it is determined 506 that the signature is not valid, the process 500 may include denying 508 the request. Denying 508 the request may be performed in various ways such as described above. For example, an error message may be transmitted to the system that transmitted the storage operation command in order to alert the system that issued the storage operation command so that the system that issued the storage operation command can take corrective action such as recalculating a digital signature and re-attempting to issue a storage operation command and/or notifying one or more users of the error so that corrective action can be taken. If, however, it is determined 506 that the signature is valid, the process 500 may include fulfilling 510 the storage operation command. Fulfilling 510 the storage operation command may include performing one or more data operations corresponding to the storage operation command that was received. Further, as noted above, if the storage operation command is in the form of a database transaction log, fulfilling 510 the storage operation command may include processing the database transaction log so that transactions recording in the transaction log are persistently stored in one or more computer readable media.

Figure 6:
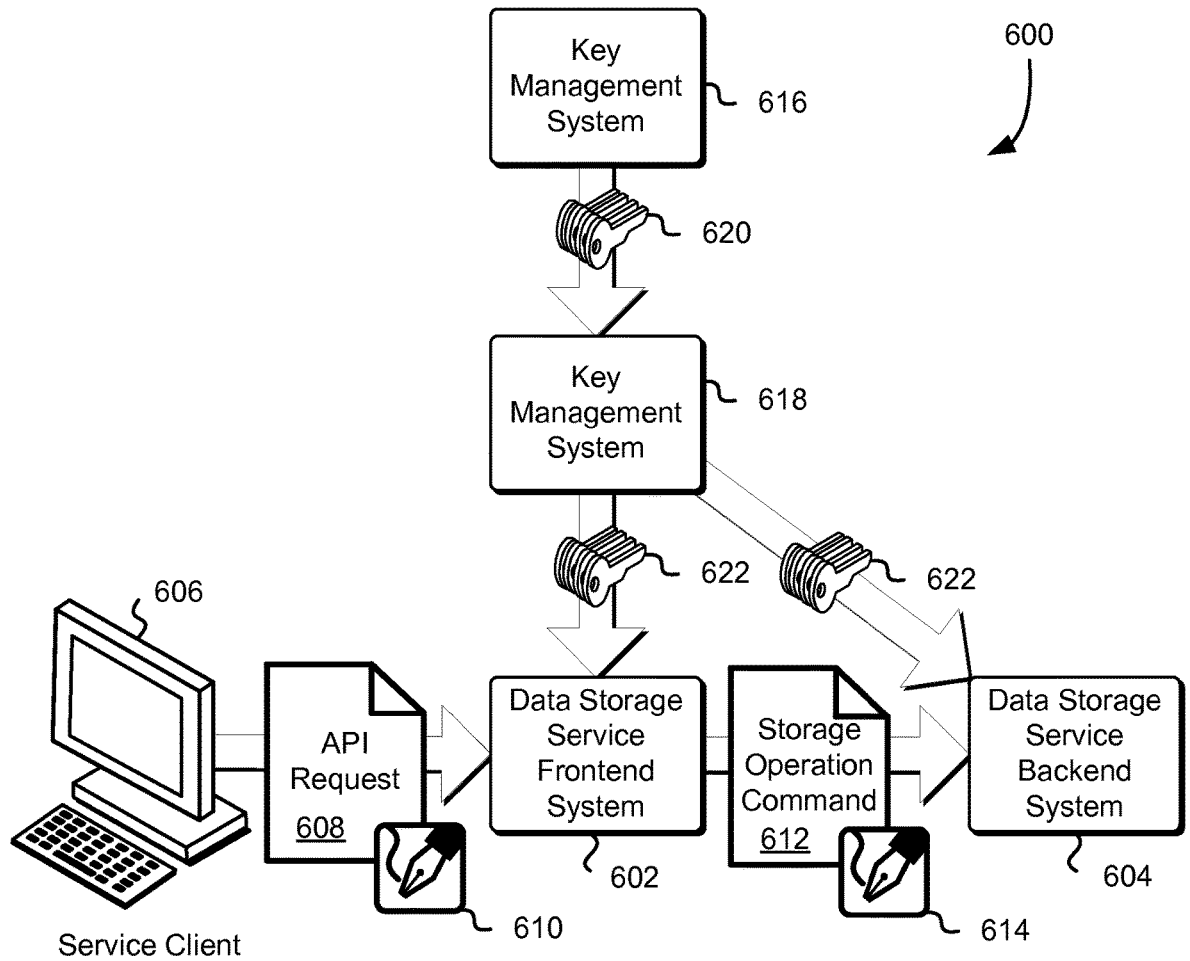
FIG. 6 shows an illustrative example of an environment in which various embodiments may be practiced.

As noted above, the techniques described herein are usable in a variety of computing environments. FIG. 6, accordingly, shows an illustrative example of an environment 600 in which various embodiments may be implemented. In this example, the environment 600 includes a data storage service frontend system 602 and a data storage service backend system 604. The data storage service frontend system may comprise one or more computing devices configured to provide an interface to which a data storage service is accessible. For example, the data storage service frontend system 602 may comprise a fleet of client computing nodes, each node comprising a computing device. Similarly, the data storage backend system 604 may comprise one or more computing devices that, along with the data storage frontend system, enable a data storage service to be provided. For example, the backend system 604 may comprise a fleet of storage nodes, each storage node comprising a computer system operable to manage and enable access to its own persistent data storage. A given client node may host a number of clients (e.g., in the form of virtual machine instances) that are each able to access at least a portion of the storage nodes.

In various embodiments, the data storage frontend system 602 and data storage backend system 604 are under the control of the same entity. In some examples, the data storage frontend system 602 and data storage backend system 604 communicate over an isolated network that is under the control of the entity. The data storage service frontend system 602, in some embodiments, includes a web server that processes web service API requests to perform various operations in accordance with data stored by the data storage service. In some examples, a web server or other server of the data storage service frontend system 602 maintains in volatile memory copies of databases which are maintained by the data storage service provided collectively by the data storage frontend system 602 and data storage service backend system 604. In this manner, the data storage service frontend system 602 is able to quickly perform data operations on the database. Thus, the data storage service is able to provide low latency data processing capabilities in connection with one or more databases maintained therein. The data storage service backend system 604 may comprise one or more data storage devices that persistently store one or more databases corresponding to one or more in-memory databases stored by the data storage service frontend system 602.

As discussed in more detail below, the data storage service frontend system 602 may provide updates to the data storage service backend system 604 to synchronize the databases stored in volatile memory at the data storage service frontend system 602 and in nonvolatile memory in the data storage service backend system 604. For example, in some embodiments, a service client 606 transmits a digitally signed API request 608 to the data storage service frontend system 602. The API request 608 may, for example, be a web service request. As the API request 608 is digitally signed, the API request may be transmitted by the service client 606 with a digital signature 610 which may be verified by the data storage service frontend system 602 such as described above. The data storage service frontend system 602 may process the API request 608 in various ways in accordance with various embodiments. For example, data storage service frontend system 602 may issue a storage operation command 612 to the data storage service backend system 604 as part of fulfilling the API request 608. In other embodiments, however, as noted, the data storage service frontend system 602 may fulfill the API request 608 and asynchronously transmit a storage operation command 612 to a data storage service backend system 604.

In various embodiments, the storage operation command 612 is digitally signed and therefore the data storage service frontend system 602 transmits the storage operation command 612 with a digital signature 614 of the storage operation command 612. As noted above, a cryptographic key used to verify the digital signature 610 from the service client 606 may be used to generate the digital signature 614 of the storage operation command 612, although different keys may be used by the data storage service frontend system 602 for verification signature 610 and generation of the other digital signature 614. In some embodiments, a first cryptographic key is used to verify the digital signature 610 and a second cryptographic key is used to generate the digital signature 614. One of the first cryptographic key and second cryptographic key may be derived from the other, although in terms of derivation, the first cryptographic key and second cryptographic key may be independent from one another.

As noted above, the keys used to verify digital signatures and generate digital signatures may be provided to the systems that performed digital signature verification and generation. Accordingly, as illustrated in FIG. 6, the environment 600 includes a first key management system 616 and a second key management system 618. In some embodiments, the first key management system 616 has access to cryptographic keys shared with various service clients who may be customers of a computing resource service provider that provides the data storage service. The first key management system 616 may transmit keys derived from those shared cryptographic keys to second key management system 618. In one example, the first key management system 616 is a central key management system used to provide cryptographic keys to various subsystems of a distributed computing environment that is distributed among multiple regions. The second key management system 618 may comprise a key management system in a particular region (i.e., a regional key management system) and the keys 620 provided from the first key management system 616 to the second key management system 618 may be generated (i.e., derived from the clients of the service) so as to only be usable within the particular region of the second key management system 618. The second key management system 618 may use one or more of the received keys 620 to derive keys 622 that are provided to the data storage service frontend system 602 and the data storage service backend system 604 to enable the data storage service frontend system and the data storage service backend system 604 to perform signature verification and/or generation. The keys 622 may be generated from the keys 620 so as to have a smaller scope of use; that is, to be useable for a smaller set of uses for which the keys 622 are usable, such as described in more detail below.

The management of cryptographic keys may be performed to ensure data security. For example, in an embodiment, cryptographic key management is performed such that a client node and/or a storage client implemented by the client node is able to access only a subset of the data that is collectively stored by the storage nodes of the backend system. As an illustrative example, each storage client may be implemented on behalf of a corresponding customer of a computing resource service provider and key management may be performed so that a particular client is only able to access data stored on behalf of its corresponding customer. To do this, the key management system 618 may provide each client node in the data storage service frontend system 602 keys in accordance with the data the client nodes are to be able to access. For example, if a particular client node hosts clients for a proper subset of a set of customers of a computing resource service provider, the particular client node may be provided keys for those customers in the proper subset without being provided keys for customers outside of the proper subset. Similarly, in embodiments where clients implemented by client nodes are customer (or other entity) specific, a client may be provided access only to one or more cryptographic keys of that customer (or other entity). Similarly, a data storage node of the data storage service backend system 604 may be provided keys for entities on behalf of which the data storage node stores data while not being provided keys for entities for which the data storage node does not store data. In this manner, in some embodiments, a client node and/or client implemented by the client node is provided only keys corresponding to data that the client node and/or client is authorized to access.

Figure 7:
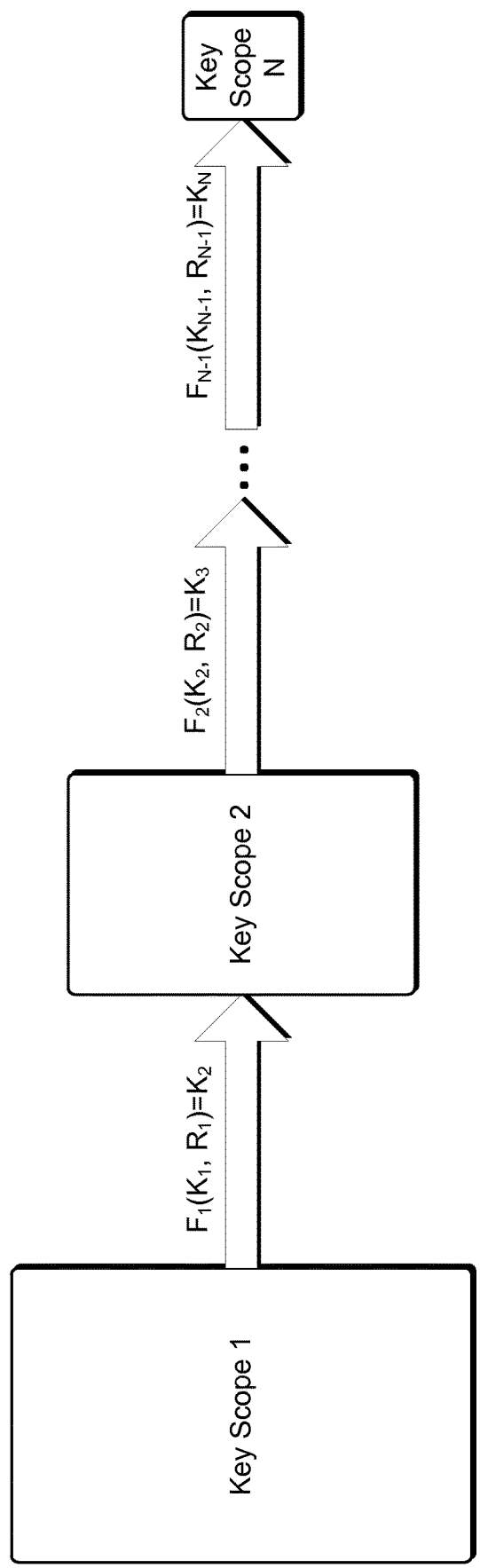
FIG. 7 shows an illustrative example of a diagram illustrating cryptographic key scoping in accordance with at least one embodiment.

FIG. 7 shows an illustrative example of a diagram illustrating the scoping of cryptographic keys in a manner usable in accordance with various embodiments of the present disclosure. In an embodiment, a first key has a first key scope (labeled as "Key Scope 1" in the figure). The first key may, for instance, be a key shared as a secret between a computing resource service provider and a customer of the computing resource service provider or, generally, a key shared between two entities. The first key scope may correspond to a set of uses for which the first key is usable (e.g., a set of uses for which use of the first key is usable for successful authentication of messages). As an example, the first key may, through appropriate derivation, be usable in multiple regions of a computing resource service provider by using an encoding of each region to derive, from the first key, a suitable regional key.

Accordingly, as illustrated in FIG. 7, the first key may be used to derive a second key having a second key scope (labeled as "Key Scope 2"). While omitted from the drawing to avoid obscuring the illustration, the first key may be used to derive multiple second keys, each with a different second key scope. This second key may be used to derive a third key, which may be used to derive another key, and so on. To derive a series of keys one from another, the following formula, or variations thereof, may be used:

$$K_N = F_{N-1}(K_{N-1}, R_{N-1})$$

where $K_N$ is the Nth derived key (N being a positive integer), $F_{N-1}$ is a one-way function or otherwise based, at least in part, on a one-way function, such as a cryptographic hash function or a key derivation function, described above, and $R_{N-1}$ is an encoding of a restriction. Thus, the allowable scope of use for $K_N$ is the scope of use of $K_{N-1}$ restricted by the restriction corresponding to $R_{N-1}$. Each encoding of a restriction $R_i$ may be an encoding of a different restriction, such as described above and below. Each function $F_i$ may be the same function or different functions $F_i$ (for some or all different values of i) may be different.

Figure 8:
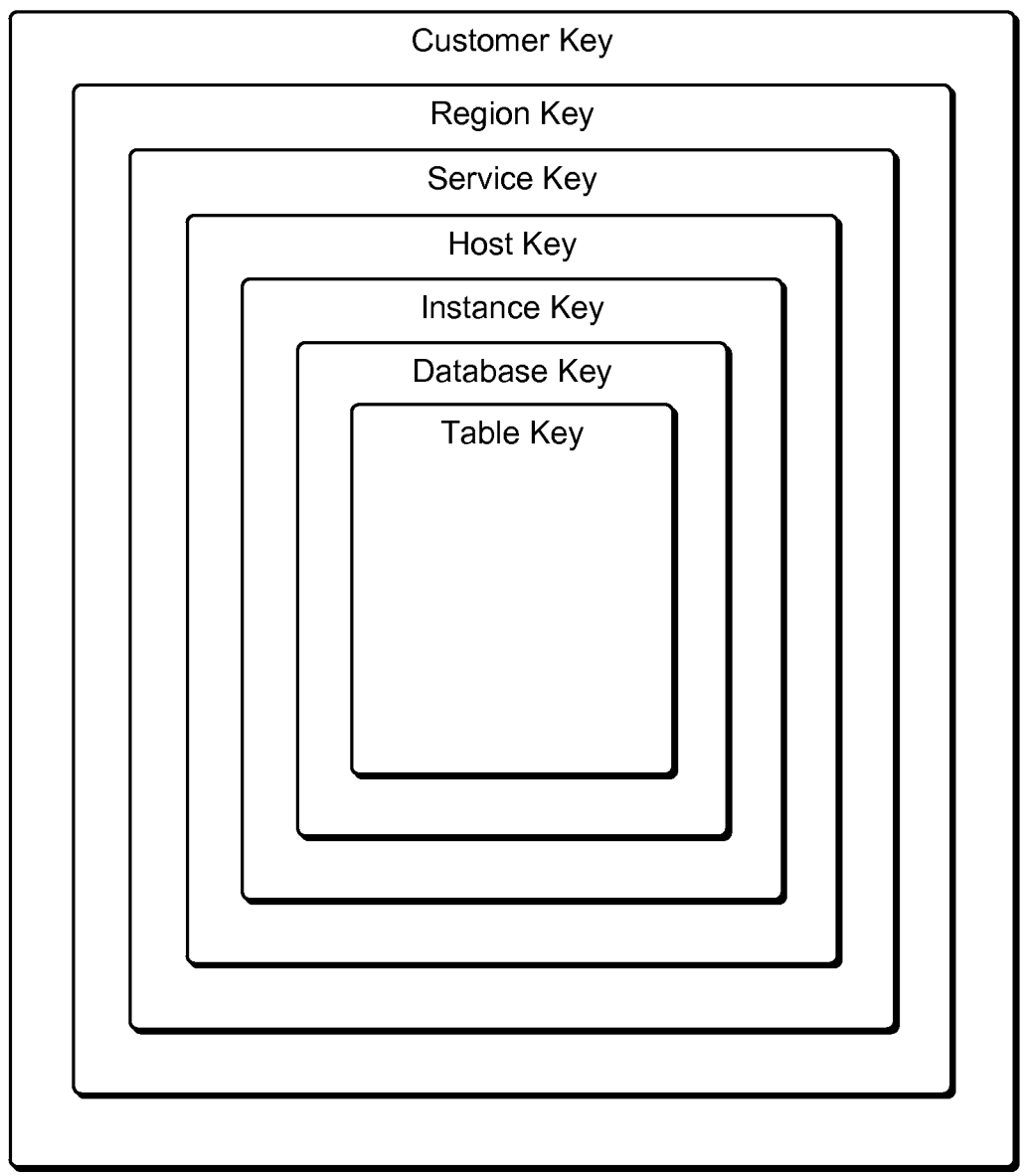
FIG. 8 shows an illustrative example of a diagram illustrating different cryptographic key scopes achieved through cryptographic key derivation in accordance with at least one embodiment.

As discussed above, numerous types of restrictions may be used to scope cryptographic keys. FIG. 8, accordingly, shows an illustrative example of a diagram illustrating one way in which a cryptographic key may be scoped. In this particular example, a series of boxes appears where each box represents a scope of use of a cryptographic key. The boxes are arranged in a Venn diagram so that, if a first box is contained in a second box, set of uses for which a first cryptographic key is usable is a proper subset of a set of uses for which a second cryptographic key is usable, where the first cryptographic key is directly or indirectly derived from the second cryptographic key.

In this illustrative figure, a customer key may be a key shared between a computing resource service provider and a customer of the computing resource service provider. The customer key may be usable to validly digitally sign requests that the customer is authorized to make (i.e., requests that the customer is able to submit and cause to be fulfilled). It should be noted that, to be usable for all uses for which the customer is authorized, it may be necessary to use the key to derive another key that is used as a signing key. In various embodiments, the encodings of restrictions are public or otherwise available to the customer so that the customer (through an appropriate computing device) is able to derive a key appropriate for a particular use. For instance, to sign an API request to be transmitted to a particular region of the service provider, the customer may derive a signing key based at least in part on the encoding for the region. Such may be necessary, for example, when devices used to verify signatures in the region lack access to the customer key and, therefore, are unable to verify digital signatures generated directly using the customer key.

As illustrated, the customer key may be used to derive a region key, usable only within a particular region. The region key may be used to derive a service key, usable only to submit requests to a particular service operated in the region. The service key may be used to derive a host key, which may be a key usable only on a particular computing device (host). The host key may be used to derive an instance key, which may be a key usable only on a particular virtual machine instance supported by the host. The instance key may be used to derive a database key, which may be a key usable only for operations on a particular database. The database key may be a key usable only for operations on a particular table of the database (in embodiments where the database utilizes table structures). The particular restrictions and order in which keys are derived are illustrative in nature and various embodiments may utilize fewer restrictions and/or may perform key derivations in a different order than illustrated in the figure. Other restrictions may also be used, such as time-based restrictions, identity-based restrictions and, generally, any way by which a set of uses of a cryptographic key is restrictable.

The various keys and scopes represented in FIG. 8 (and variations thereof) may be derived in various ways in accordance with various embodiments. For example, different devices of different computer systems may perform the various derivations that ultimately result in a signing key being derived. For instance, a key management system may perform one derivation and transmit the result to another system which performs further derivation. In some examples, a device performing digital signature generation and/or digital signature verification may perform one or more derivations to obtain a signing (verifying) key. Features of a request and/or command may be used to determine which restrictions (e.g., which customer, which database, which table, which host, etc.) need to be used to perform one or more key derivations. Other variations are also considered as being within the scope of the present disclosure.

For example, as discussed above, a data storage client (e.g., frontend system, as above) may digitally sign requests to a data storage system (e.g., backend system, as above) for verification of the corresponding digital signatures by the data storage system. Results and other communications transmitted from the data storage system to the client may also be digitally signed in accordance with the techniques described above to enable the client device to authenticate communications from the data storage system. As another example, a client device or other device accessible to the client device may store one or more policies (e.g., access control policies) applicable to an entity for which data storage operations are performed. Communications from the client device to the data storage system may include an encoding of one or more policies to be enforced by the data storage system. The policies may comprise a portion of the communications that are digitally signed. The policies may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions (e.g., by encoding an access control list (ACL) or portion thereof) that must be satisfied for a data storage operation to be performed.

Figure 9:
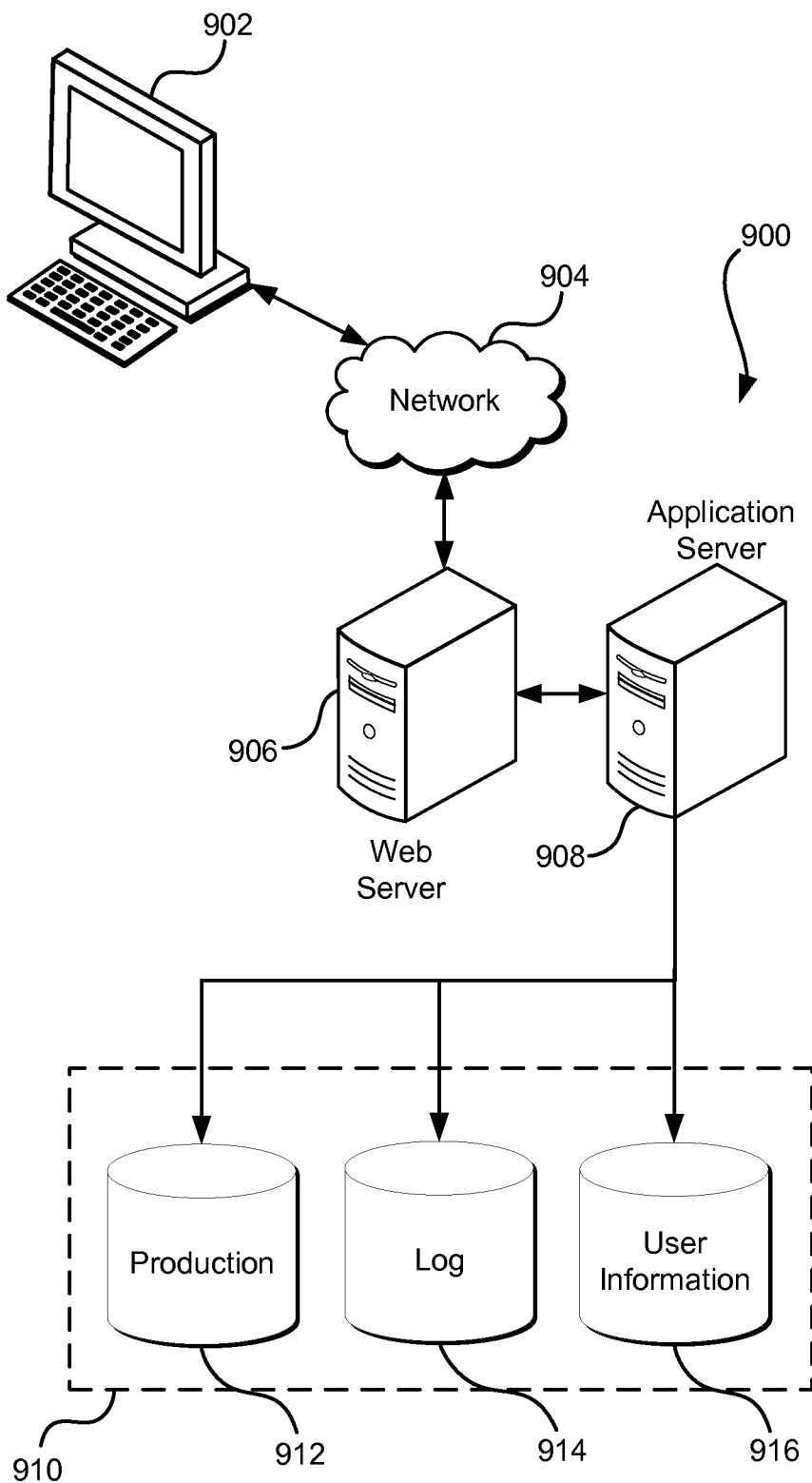
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a key management system comprising one or more computing devices, a cryptographic key;
   receiving, at a first server, a request to perform a database query, the request being in accordance with an application level protocol;
   as a result of receipt of the request, generating, by a client application of a virtual machine instance running on the first server, an input/output command indicating a block address of a block to be operated upon to fulfill the input/output command;
   generating, based at least in part on the cryptographic key and the input/output command, a digital signature of the input/output command; and
   transmitting the generated input/output command and the generated digital signature to a second server operable to use the cryptographic key to verify the digital signature and, as a result of the digital signature being verified, fulfill the generated input/output command by performing the input/output command on a storage volume stored on the second server.

2. The computer-implemented method of claim 1, wherein the input/output command is formatted in accordance with a binary input/output protocol.

3. The computer-implemented method of claim 1, wherein:
   the request includes a digital signature of at least a portion of the request;
   the method further comprises using the cryptographic key to verify the digital signature of the at least the portion of the request; and
   transmitting the generated input/output command is contingent on the digital signature of the at least the portion of the request being verified.

4. The computer-implemented method of claim 1, wherein the input/output command is a command to process a database transaction log recording one or more database transactions performed by the first server.

5. The computer-implemented method of claim 1, wherein the request is a structured query language command.

6. The computer-implemented method of claim 1, wherein the request is a web service request.

7. A system of a computing resource service provider, comprising:
   a first computing device operable to:
      receive, from a computing device associated with a customer of the computing resource service provider, a request to perform a data storage operation;
      as a result of receipt of the request, use a cryptographic key to generate a digital signature for a block-level data storage operation command indicating a set of blocks to be operated on to fulfill the data storage operation command, the cryptographic key obtained by the first computing device as a result of an association of the cryptographic key with the customer; and
      transmit the digital signature and the data storage operation command to a second computing device;
   the second computing device operable to:
      receive the transmitted digital signature and the data storage operation command;
      verify the digital signature, using the cryptographic key, for the data storage operation command; and
      as a result of verifying the digital signature, fulfill the data storage operation command by operating on the set of blocks indicated in the block-level data storage command, the set of blocks associated with at least one storage of the second computing device.

8. The system of claim 7, wherein the first computing device is configured to associate the cryptographic key with the customer.

9. The system of claim 7, wherein:
   the system further comprises a subsystem that stores at least the cryptographic key in association with the customer;
   the first computing device is configured to provide proof of the request to the subsystem; and
   the subsystem is further configured to provide the cryptographic key to the first computing device as a result of verifying the provided proof.

10. The system of claim 7, wherein the data storage operation command is formatted in accordance with a binary input/output protocol.

11. The system of claim 7, wherein:
   the first computing device is further operable to use the cryptographic key to verify a digital signature of the request; and
   transmission of the data storage operation command is contingent on the digital signature of the request being verified.

12. The system of claim 7, wherein the data storage operation command is a command to process a log of one or more database transactions performed by the first computing device.

13. The system of claim 7, wherein the request is formatted in accordance with a first protocol and the data storage operation command is formatted in accordance with a second protocol different from the first protocol.

14. The system of claim 7, wherein:
   the request is submitted by an entity; and
   the system further comprises a key management system operable to:
      store a first cryptographic key shared with the entity;
      derive the cryptographic key based at least in part on the first cryptographic key; and
      provide the cryptographic key to the first computing device and second computing device.

15. The system of claim 7, wherein the first computing device is further operable to:
   store multiple cryptographic keys, each corresponding to a different entity; and
   select, based at least in part on a feature of the request, the cryptographic key from the stored multiple cryptographic keys.

16. The system of claim 7, wherein the request is received from a third party customer of a service provider that operates the system.

17. One or more non-transitory computer-readable storage media having collectively stored thereon executable instructions that, upon execution by one or more processors of a data storage node, cause the data storage node to at least:
receive a block-level input/output command and a digital signature of the block level input/output command, the block-level input/output command including information identifying a set of block addresses to which the data storage node is to perform a storage operation and the digital signature generated by a cryptographic key;
obtain the cryptographic key;
verify the digital signature of the block-level input/output command using the cryptographic key; and
as a result of the digital signature of the block-level input/output command being verified using the cryptographic key, fulfill the block-level input/output command by performing the block-level input/output command on at least one storage of the data storage node.

18. The one or more non-transitory computer-readable storage media of claim 17, wherein the input/output command specifies a device-level address for data to be operated upon by fulfillment of the command.

19. The one or more non-transitory computer-readable storage media of claim 17, wherein the input/output command is formatted in accordance with a binary input/output protocol.

20. The one or more non-transitory computer-readable storage media of claim 17, wherein:
the input/output command is received as a result of receipt of a request transmitted to a client of the data storage node with a digital signature of the request; and
the cryptographic key is usable to verify the digital signature of the request.

21. The one or more non-transitory computer-readable storage media of claim 17, wherein:
the data storage node stores data on behalf of a plurality of entities; and
the instructions, when executed by the one or more processors, cause the data storage node to select, based at least in part on an entity associated with the input/output command, the cryptographic key from multiple cryptographic keys.

22. The one or more non-transitory computer-readable storage media of claim 17, wherein:
the input/output command comprises a database transaction log; and
the instructions that cause the data storage node to fulfill the input/output command cause the data storage node to process the database transaction log.

23. The one or more non-transitory computer-readable storage media of claim 17, wherein the instructions further comprise instructions that, when executed by the one or more processors, cause the data storage node to obtain the cryptographic key from a key management system.

24. The one or more non-transitory computer-readable storage media of claim 17, wherein the instructions further comprise instructions that, when executed by the one or more processors, cause the data storage node to derive the cryptographic key based at least in part on another cryptographic key corresponding to data affected by the input/output command.

25. The one or more non-transitory computer-readable storage media of claim 17, wherein the input/output command is unencrypted when received by the data storage node.

26. The computer-implemented method of claim 1, wherein the input/output command is a storage operation command to read or write data.

* * * * *